(12) United States Patent
Cain et al.

(10) Patent No.: US 10,019,448 B2
(45) Date of Patent: Jul. 10, 2018

(54) METHODS AND SYSTEMS FOR PROVIDING FILE DATA FOR MEDIA FILES

(75) Inventors: James Westland Cain, Bershire (GB); Simon Darryl Rogers, Berkshire (GB); Michael James Weaver, Berkshire (GB)

(73) Assignee: Quantel Limited, Berkshire (GB)

( * ) Notice: Subject to any disclaimer, the term of this patent is extended or adjusted under 35 U.S.C. 154(b) by 830 days.

(21) Appl. No.: 14/236,842

(22) PCT Filed: Jul. 26, 2012

(86) PCT No.: PCT/GB2012/051808
§ 371 (c)(1),
(2), (4) Date: May 2, 2014

(87) PCT Pub. No.: WO2013/021168
PCT Pub. Date: Feb. 14, 2013

(65) Prior Publication Data
US 2014/0289257 A1    Sep. 25, 2014

(30) Foreign Application Priority Data
Aug. 5, 2011 (GB) .................................. 1113621.5

(51) Int. Cl.
*G06F 17/30* (2006.01)
*H04N 21/24* (2011.01)
(Continued)

(52) U.S. Cl.
CPC .. *G06F 17/30076* (2013.01); *G06F 17/30091* (2013.01); *G06F 17/30106* (2013.01);
(Continued)

(58) Field of Classification Search
CPC ......... G06F 17/30076; G06F 17/30106; G06F 17/30091; H04L 65/607; H04N 21/232; H04N 21/2402; H04N 21/2662
See application file for complete search history.

(56) References Cited

U.S. PATENT DOCUMENTS

| 4,276,544 A | 6/1981 | Iinuma |
| 6,029,160 A | 2/2000 | Cabrera et al. |

(Continued)

FOREIGN PATENT DOCUMENTS

| EP | 1026872 | 8/2000 |
| EP | 1400973 | 3/2004 |

(Continued)

OTHER PUBLICATIONS

U.S., "Office Action", "from U.S. Appl. No. 14/110,227", dated Sep. 8, 2015, pp. 1-34, Published in: US.

(Continued)

*Primary Examiner* — Albert M Phillips, III
(74) *Attorney, Agent, or Firm* — Fogg & Powers LLC

(57) ABSTRACT

A method of providing file data for a media file from a file system, where the format of the file requires that the file comprise a plurality of segments of file data located at pre-declared locations within the file. The file data making up the file is based upon derived file data. After receiving a request to open the file, a maximum segment length for the file is determined based on the desired properties of the file. In response to a request for the location of a segment within the file, a location calculated by considering each segment of the file to have the maximum segment length is returned. In response to a request for file data from a segment of the file, generated file data for the segment is returned, where the
(Continued)

generated file data comprises the derived file data and padding data to give the generated file data the maximum segment length.

23 Claims, 9 Drawing Sheets

(51) Int. Cl.
  *H04N 21/2662* (2011.01)
  *H04N 21/232* (2011.01)
  *H04L 29/06* (2006.01)

(52) U.S. Cl.
  CPC ......... *H04L 65/607* (2013.01); *H04N 21/232* (2013.01); *H04N 21/2402* (2013.01); *H04N 21/2662* (2013.01)

(56) References Cited

U.S. PATENT DOCUMENTS

| | | | |
|---|---|---|---|
| 6,411,970 | B1 | 6/2002 | Aitken et al. |
| 6,477,544 | B1 | 11/2002 | Bolosky et al. |
| 7,870,224 | B1 | 1/2011 | Maigatter |
| 7,913,164 | B1 | 3/2011 | Svendsen |
| 8,639,734 | B1 | 1/2014 | Cook |
| 8,769,685 | B1 | 7/2014 | Conrad et al. |
| 9,307,025 | B1 | 4/2016 | Kini |
| 2004/0006693 | A1 | 1/2004 | Vasnani et al. |
| 2005/0041606 | A1 | 2/2005 | Hori et al. |
| 2005/0210083 | A1 | 9/2005 | Kodama |
| 2006/0056455 | A1* | 3/2006 | Ruiz Floriach ......... H04L 12/66 370/469 |
| 2006/0224760 | A1 | 10/2006 | Yu et al. |
| 2006/0269147 | A1 | 11/2006 | Shen et al. |
| 2007/0162568 | A1 | 7/2007 | Gupta et al. |
| 2008/0209014 | A1 | 8/2008 | Anderson |
| 2009/0006634 | A1 | 1/2009 | Parsell et al. |
| 2009/0100496 | A1 | 4/2009 | Bechtolsheim et al. |
| 2010/0082740 | A1 | 4/2010 | Tsubaki |
| 2010/0161825 | A1 | 6/2010 | Ronca et al. |
| 2010/0195558 | A1 | 8/2010 | Koskinen |
| 2010/0235542 | A1 | 9/2010 | Visharam et al. |
| 2010/0322302 | A1 | 12/2010 | Rodriguez et al. |
| 2011/0082945 | A1 | 4/2011 | Myers et al. |
| 2011/0087727 | A1 | 4/2011 | Takakura et al. |
| 2011/0099594 | A1 | 4/2011 | Chen et al. |
| 2011/0202674 | A1 | 8/2011 | Su et al. |
| 2011/0242123 | A1 | 10/2011 | Momosaki et al. |
| 2011/0314095 | A1 | 12/2011 | Gupta et al. |
| 2012/0023155 | A1 | 1/2012 | Myers et al. |
| 2012/0254456 | A1 | 10/2012 | Visharam et al. |
| 2014/0122545 | A1 | 5/2014 | Cain et al. |
| 2014/0237077 | A1 | 8/2014 | Cain et al. |

FOREIGN PATENT DOCUMENTS

| | | |
|---|---|---|
| GB | 2446832 | 8/2008 |
| WO | 0014632 | 3/2000 |
| WO | 2004090791 | 10/2004 |
| WO | 2006087676 | 8/2006 |
| WO | 2007025029 | 3/2007 |
| WO | 2011093629 | 8/2011 |

OTHER PUBLICATIONS

U.S., "Final Office Action", "from U.S. Appl. No. 14/110,227", dated May 13, 2016, pp. 1-26, Published in: US.
U.S., "Office Action", "from U.S. Appl. No. 14/236,844", dated Apr. 20, 2016, pp. 1-32, Published in: US.
GB Intellectual Property Office, "GB Search Report", "from GB Patent Application No. GB1105976.3", dated Aug. 15, 2011, Published in: GB, 1 page.
European Patent Office, "International Search Report", "from PCT Application No. PCT/GB2012/050602", dated Apr. 26, 2013, pp. 1, Published in: WO.
UK Intellectual Property Office, "Search Report from GB Application No. 1113621.5 dated Nov. 29, 2011", Nov. 29, 2011, pp. 1, Published in: GB.
European Patent Office, "International Search Report from PCT Application No. PCT/GB2012/051808 dated Jun. 11, 2012", Jun. 11, 2012, Published in: EP, 2 pages.
UK Intellectual Property Office, "Search Report from GB Application No. 1114628.9 dated Dec. 1, 2011", Dec. 1, 2011, Published in: GB, 1 page.
European Patent Office, "International Search Report from PCT Application No. PCT/GB2012/051807 dated Jun. 11, 2012", Jun. 11, 2012, Published in: WO, 2 pages.
Vetro et al., "Media Conversions to Support Mubile Users", "Canadian Conference on Electrical and Computer Engineering May 13-16, 2001", May 13, 2001, pp. 607-612, vol. 1, Publisher: IEEE, Published in: US.
U.S., "Advisory Action", "from U.S. Appl. No. 14/110,227", dated Jan. 22, 2016, pp. 1-5, Published in: US.
United States Patent and Trademark Office, "Office Action", "From U.S. Appl. No. 14/110,227", dated Apr. 20, 2017, pp. 1-40, Published in: U.S.
United States Patent and Trademark Office, "Final Office Action", "from U.S. Appl. No. 14/236,844", dated Mar. 9, 2017, pp. 1-27, Published in: U.S.
United States Patent and Trademark Office, "Final Office Action for U.S. Appl. No. 14/110,227", dated Dec. 21, 2017, pp. 1-35, Published in: U.S.

* cited by examiner

METHODS AND SYSTEMS FOR PROVIDING FILE DATA FOR MEDIA FILES

FIELD OF THE INVENTION

The present invention concerns methods and systems for providing file data for media files, for example files containing video and/or audio data. More particularly, but not exclusively, the invention concerns improved methods and systems for providing file data for media files, that can be used with existing media applications and systems.

BACKGROUND OF THE INVENTION

Media applications and systems, for example video editing or streaming of video over the Internet, often require that only a particular time range of the media in the file be used. For example, a user of a video editing program may wish to edit only a particular time range of a video file, or a user may wish to view only the middle portion of a video file. In order to allow this to be done, it is common for media file formats to divide a file into segments corresponding to particular time ranges, and for an index to be provided that declares where the segments can be found in the file.

An example of such a media file format is MPEG-4. The structure of an MPEG-4 file is shown in FIG. 1. The file 10 comprises an index 11, and a plurality of GOPs ("groups of pictures") 12a, 12b, 12c to 12d. A GOP is a series of images making up a particular sequence of video. The images are compressed, and as can be seen from FIG. 1 this results in the GOPs being of different lengths (i.e. being made up of a different number of bytes). One reason for this is that the video a GOP represents will compress to a different size depending on the nature of the images making up the video; for example, as compression techniques include identifying the differences between images in a series, a series of very similar images will generally be compressed to a much smaller size than a series of images in which differ substantially from each other. The location of a GOP in a file will therefore depend on the size of each preceding GOP. The index 11 provides a mapping from time ranges of video to byte ranges in the file 10, thus allowing the GOP (or GOPs) corresponding to a particular time range of video to be found.

Another example of such a media file format is fragmented MPEG-4, the structure of which as shown in FIG. 2. A file 20 comprises a header 21, a plurality of "moof"s (movie fragments) 22a, 22b, 22c and so on, and a footer 23. Each moof provides a portion of video of a fixed duration, for example two seconds of video. FIG. 2 further shows the internal structure of a moof. A moof comprises a header file 25 and a plurality of GOPs 26a, 26b to 26c. Thus, each moof is much the same as a single MPEG-4 file.

The header 21 contains in XML format details of the moofs in the file 20 and the time ranges for the video they contain; for example, that moofs 22a, 22b and 22c provide video in the time ranges 0-2 seconds, 2-4 seconds and 4-6 second respectively.

The footer 23 contains in XML format details of the byte ranges for the moofs in the file 20. As can be seen in FIG. 2, even though each moof contains a fixed duration of video, the moofs themselves are of variable length. Thus, the byte range for a moof in the file 20 cannot be determined merely from its time range, and the footer 23 is required in order to find a particular moof within the file 20.

The use of such media files in a known system is now described with reference to FIGS. 3 and 4. FIG. 3 is a schematic diagram of a known networked computer system. A file system 31 comprises a data store 32, a file record database 33, and a file system gateway 34. The file system gateway 34 is in communication with an Internet Information Services (IIS) web server 35 (as developed by Microsoft). The IIS web server 35 communicates via the Internet 36 with a personal computer 37 running a video streaming client application 38, in this case a Silverlight application. The IIS web server 35 streams video to the client application 38 using the Smooth Streaming media service.

As is well known, the Smooth Streaming media service provides video in the form of fragmented MPEG-4 files at a quality level appropriate to the bandwidth over which the video is streamed. In essence, video is requested by the client application 38 at the highest quality the bandwidth it has available can support. (Higher quality video will be larger in size, and so will require greater bandwidth.) The client application 38 receives video from the IIS web server 35, which it stores in a buffer. When the buffer contains a sufficient duration of video (i.e. a number of seconds of video), the client application 38 begin to display the video. If the client application 38 finds that the duration of video in the buffer has increased beyond a certain point, this indicates that additional bandwidth is available, and so the client application 38 increases the quality of the video it requests. Conversely, if the amount of video in the buffer falls beyond a certain point, this indicates that insufficient bandwidth is available, and so the client application 38 lowers the quality of the video it requests. In order to provide the differing qualities of video to the client application 38, the IIS web server 35 requires that fragmented MPEG-4 files are available that provide versions of the video being streamed in all the quality levels that may be required, so that it can provide them as and when requested by the client application 38.

FIG. 4 shows a typical use of files of differing qualities by an IIS web server 35 using Smooth Streaming. The IIS web server 35 has files 41 to 45 of qualities 150 Kb/s, 300 Kb/s, 600 Kb/s, 900 Kb/s and 2000 Kb/s respectively. Initially, the client application 38 requests video of quality 150 Kb/s from file 41. When a certain duration of video has been obtained, display of the video will begin. The buffer then continues to receive video from the file 41. As the bandwidth required by this low-quality video is small, the duration of video in the buffer quickly increases (as video is being received at a faster rate than it is being displayed), and once it exceeds a certain point the client application 38 requests the next-highest quality video of quality 300 Kb/s from file 42. This continues as the buffer continues to fill, with at appropriate points the client application 38 requesting video at higher and higher qualities. The duration of the video in the buffer may also fall below a certain point, for example due to a restriction in bandwidth, or because a change in the content of the video causes the same duration of video of the same quality of video to be larger in size (this is explained in more detail below). In this case, the client application 38 requests a lower quality of video. An example of this can be seen in FIG. 4 where the client application 38 is initially requesting the video of quality 2000 Kb/s from file 45, when the duration of video in the buffer falls below a certain point changes to requesting the video of lower quality 900 Kb/s from file 44, and then once the duration of video in the buffer has increased again returns to requesting the video of quality 2000 Kb/s from file 45.

It can be seen that for any particular time segment of video, the client application 38 will only request the time segments from one of the files, with the choice of file being determined by the duration of video currently stored in the buffer. In practice, the smallest segment of a file that the IIS server 35 sends to the client application 8 is a single moof. Thus, for any particular file it is likely that only a small number of the moofs it contains will be required. However, the IIS server 35 requires the footer 33 in order to be able to locate any particular moof in a file. As the footer contains the locations of all the moofs in the file, this requires the locations of all the moofs to be specified before any moofs can be obtained. The location of a moof will depend on the size of each preceding moof, which will depend on how well the video in each moof is compressed. Thus, before any moof can be obtained from any particular file, the size of every moof in the file needs to be known.

In practice, the files of each required quality are generated in advance, so that particular time segments from the files can be provided by the file system 31 to the IIS web server 35 when required. In the common scenario of a web site serving a single video to multiple users (over time and/or at the same time), the overhead of creating the files in advance is not great. This is because there are few files to serve to many recipients. However, in scenarios in which there are many files that may be served to a small number of recipients, the overhead of generating the required files in advance can become extremely significant, and may be overly onerous or even impracticable. An example of this would be where the file system 31 is an archive containing many media files. In this case, files of each required quality would need to be generated for every single file in the archive, even though any particular file may not be viewed at all. (A partial solution to this would be to create the files of differing quality only when a particular file is selected to be viewed, but this would cause a large delay before viewing of a selected file could begin.) Further, there may simply not be sufficient space to store all the required files.

Another situation in which similar disadvantages arise is the editing of video using editing software. A video file in a particular format may be stored in a file system. However, the editing software may use a different file format to edit files; for example the file format used by the editing software may be MPEG-4. When editing a file in MPEG-4 format, the editing software will initially request the index, so that it can locate particular GOPs within the file. This requires the location of each GOP to be declared, which requires the length of each GOP to be known, which in turn depends on how the images in each GOP are compressed. Therefore, even if only a small portion of the video is to be edited, in order to locate the corresponding GOPs within the MPEG-4 file, the entire MPEG-4 file must be generated before editing can begin.

The present invention seeks to solve and/or mitigate the above-mentioned problems. Alternatively or additionally, the present invention seeks to provide improved method and systems for providing file data for media files that can be used with existing media applications and systems.

SUMMARY OF THE INVENTION

In accordance with a first aspect of the invention there is provided a method of providing file data for a media file from a file system, wherein the format of the file requires that the file comprise a plurality of segments of file data located at pre-declared locations within the file, and wherein the file data making up the file is based upon derived file data, the method comprising the steps of:

a) receiving a request to open the file;

b) based on the desired properties of the file, determining a maximum segment length for the file;

c) in response to a request for the location of a segment within the file, returning a location calculated by considering each segment of the file to have the maximum segment length;

d) in response to a request for file data from a segment of the file, returning generated file data for the segment, wherein the generated file data comprises the derived file data and padding data to give the generated file data the maximum segment length.

By assuming that each segment of the file has a maximum segment length, a location for each segment of the file can be calculated and declared, without the file data making up the segment having to be generated in order to determine the segment length. Instead, the file data for a particular segment can be generated and returned only if and when requested, avoiding the need for the entire file to be generated in advance and stored in the file system. At the point at which the file data for a particular segment is requested, any discrepancy between the length of the file data derived from the existing file data and the maximum segment length is resolved by simply adding padding data to derived file data. Thus, the length of the file data provided by the file system will match the length pre-declared by the file system. This has the particular advantage that the properties of the file data provided by the file system are in accordance with the format of the file being requested, and so the method can be used with existing media applications and system that expect the file being requested to have been fully generated and stored in advance.

Advantageously, the desired properties of the file include the quality of media provided by the file. The invention is particularly suited to applications and systems in which a single set of file data is used to produce file data of multiple qualities. However, the invention is equally applicable for other desired properties, for example different file formats, video frame sizes, colour properties and the like. The desired properties for the file may be derived from the structure of the request for the file, including the file name, for example.

Each segment of file data in the file may correspond to a section of media of a pre-determined time period. The time period then identifies the required file data from the existing file data.

Preferably, the maximum segment length is at least the maximum possible length of file data corresponding to a section of media of the pre-determined time duration. This allows the method to work for all possible existing file data. The maximum segment length may be the same as the maximum possible length. Alternatively, the maximum segment length may be much larger than the maximum possible length.

Advantageously, the maximum segment length is calculated by assuming a minimum possible compression of the file data making up a segment.

Preferably, the generated file data comprises the derived file data followed by the padding data. Alternatively, the padding data could precede and/or be interspersed with the generated file data, as well as/instead of following the generated file data. The padding data may be instructions used in the format of the file to denote padding. Alternatively the padding may be blank data, for example a string of zeros.

Advantageously, the derived file data is derived from existing file data. The existing file data may be stored in the file system, or may be stored elsewhere. Alternatively the derived file data may be derived from a stream of file data transmitted from a remote source (for example a stream of video of a live event), or may be generated using an algorithm. The file data may be derived from the existing file data by converting the existing file data to a different quality. Advantageously, the quality of the derived file data is determined using the maximum segment length. For example, the quality may be chosen so that the length of the derived file data is similar to the maximum segment length, minimising the amount of padding data required. Alternatively, the file data maybe derived by converting the existing file data to a different format, or by converting the existing file data in any other suitable way. The derived file data may be derived from existing file data, or from a stream of file data, simply by extracting the portion of file data required from the existing file data or stream.

The method may further comprise the step of generating an index for the locations of each of the segments in the file. Whether this is applicable depends on the properties of the format of the file; the locations of the segments can be pre-declared in whatever way is required by the format. The file may comprise the index. Alternatively, the index may be provided as a separate file.

Advantageously, padding data is dynamically generated and sent by the file system as the file data from the file that corresponds to padding data is requested. This means the segment does not need to be generated and stored in the file system prior to sending the file data.

In accordance with a second aspect of the invention there is provided a file system for providing file data for a media file, wherein the format of the file requires that the file comprise a plurality of segments of file data located at pre-declared locations within the file, and wherein the file data making up the file is based upon derived file data, wherein the file system is arranged:

a) to receive a request to open a file;
b) based on the desired properties of the file, to determining a maximum segment length for the file;
c) in response to a request for the location of a segment within the file, to return a location calculated by considering each segment of the file to have the maximum segment length;
d) in response to a request for file data from a segment of the file, to return generated file data for the segment, wherein the generated file data comprises the derived file data and padding data to give the derived file data the maximum segment length.

Advantageously, the desired properties of the file include the quality of media provided by the file.

Each segment of file data in the file may correspond to a section of media of a pre-determined time duration.

Preferably, the maximum segment length is at least the maximum possible length of file data corresponding to a section of media of the pre-determined time duration.

Advantageously, the maximum segment length is calculated by assuming a minimum possible compression of the file data making up a segment.

Preferably, the generated file data comprises the derived file data followed by the padding data.

Advantageously, the derived file data is derived from existing file data. The file data may be derived from the exiting file data by converting the existing file data to a different quality. Advantageously, the quality of the derived file data is determined using the maximum segment length.

The file system may be further arranged to generate an index for the locations of each of the segments in the file. The file may comprise the index.

Advantageously, padding data is dynamically generated and sent by the file system as the file data from the file that corresponds to padding data is requested.

In accordance with a third aspect of the invention there is provided a computer program product arranged, when executed, to perform the steps of any of the methods described above.

In accordance with a fourth aspect of the invention there is provided a computer program product arranged, when executed on a computing device, to provide a file system as described above.

It will of course be appreciated that features described in relation to one aspect of the present invention may be incorporated into other aspects of the present invention. For example, the method of the invention may incorporate any of the features described with reference to the apparatus of the invention and vice versa.

While the present invention is particularly suited to embodiments where the format of the file is MPEG-4 or fragmented MPEG-4, the skilled person will appreciate that it is equally suited to any other file format in which locations of segments may be pre-declared prior to the content of those segments being required. Similarly, while the present invention is particularly suited to an embodiment where file are being provided to an IIS server sending files to a client application using the Smooth Streaming media service, the skilled person will appreciate that it is equally suited to other media applications and systems.

DESCRIPTION OF THE DRAWINGS

Embodiments of the present invention will now be described by way of example only with reference to the accompanying schematic drawings of which.

DETAILED DESCRIPTION

Figure 1:
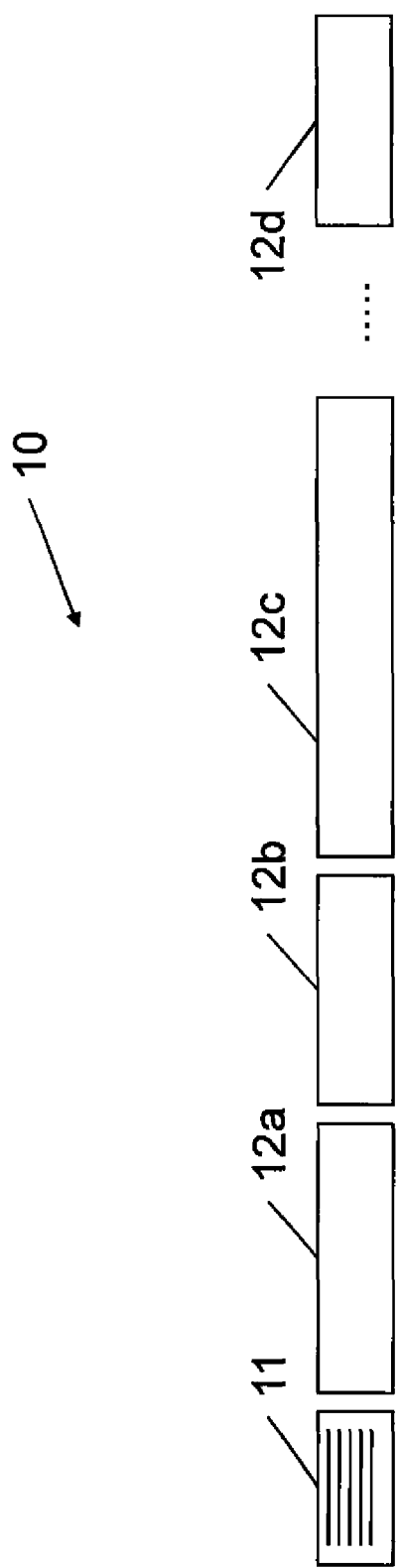
FIG. 1 shows the structure of a conventional MPEG-4 file.
Figure 2:
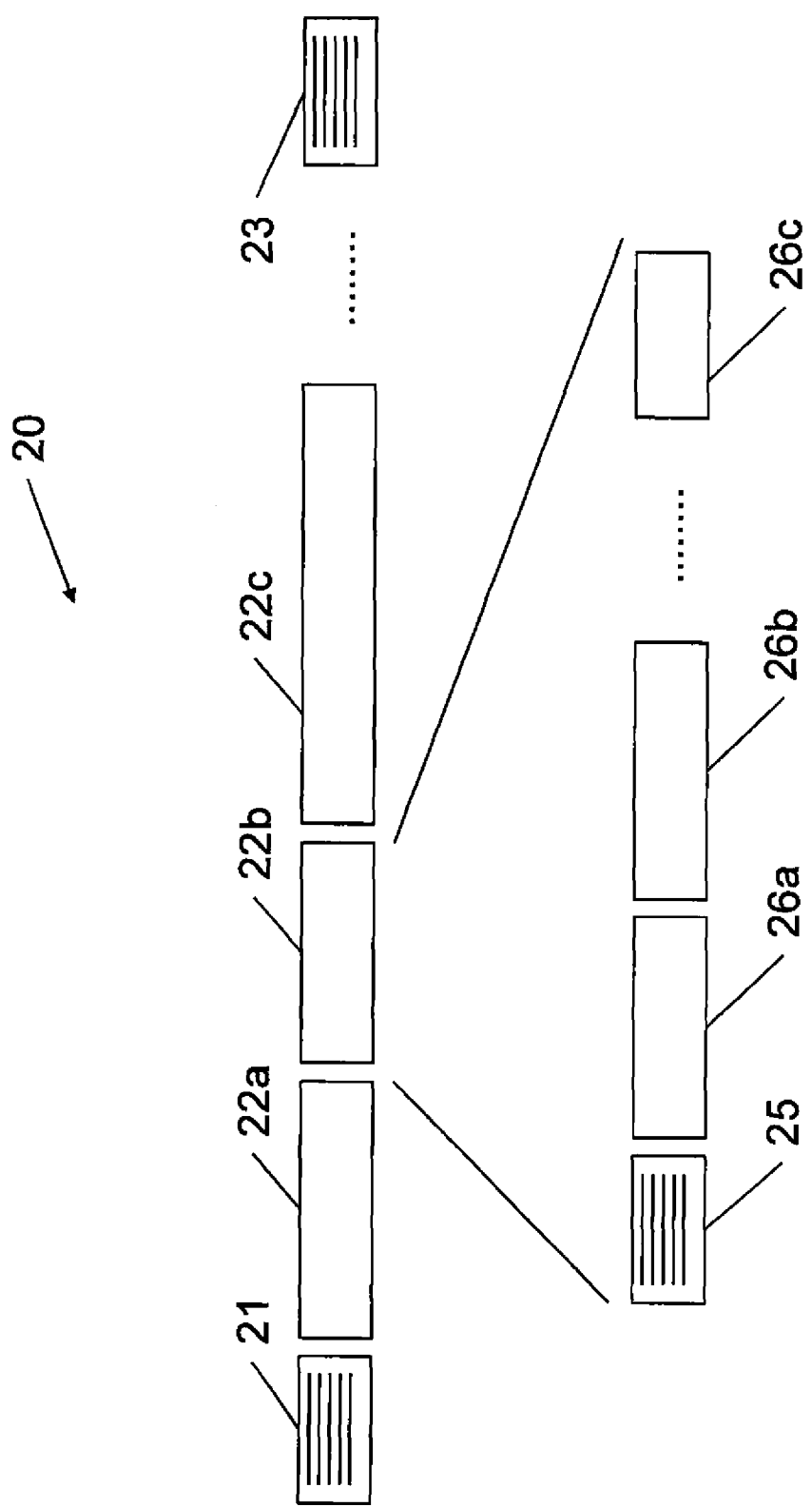
FIG. 2 shows the structure of a conventional fragmented MPEG-4 file.
Figure 3:
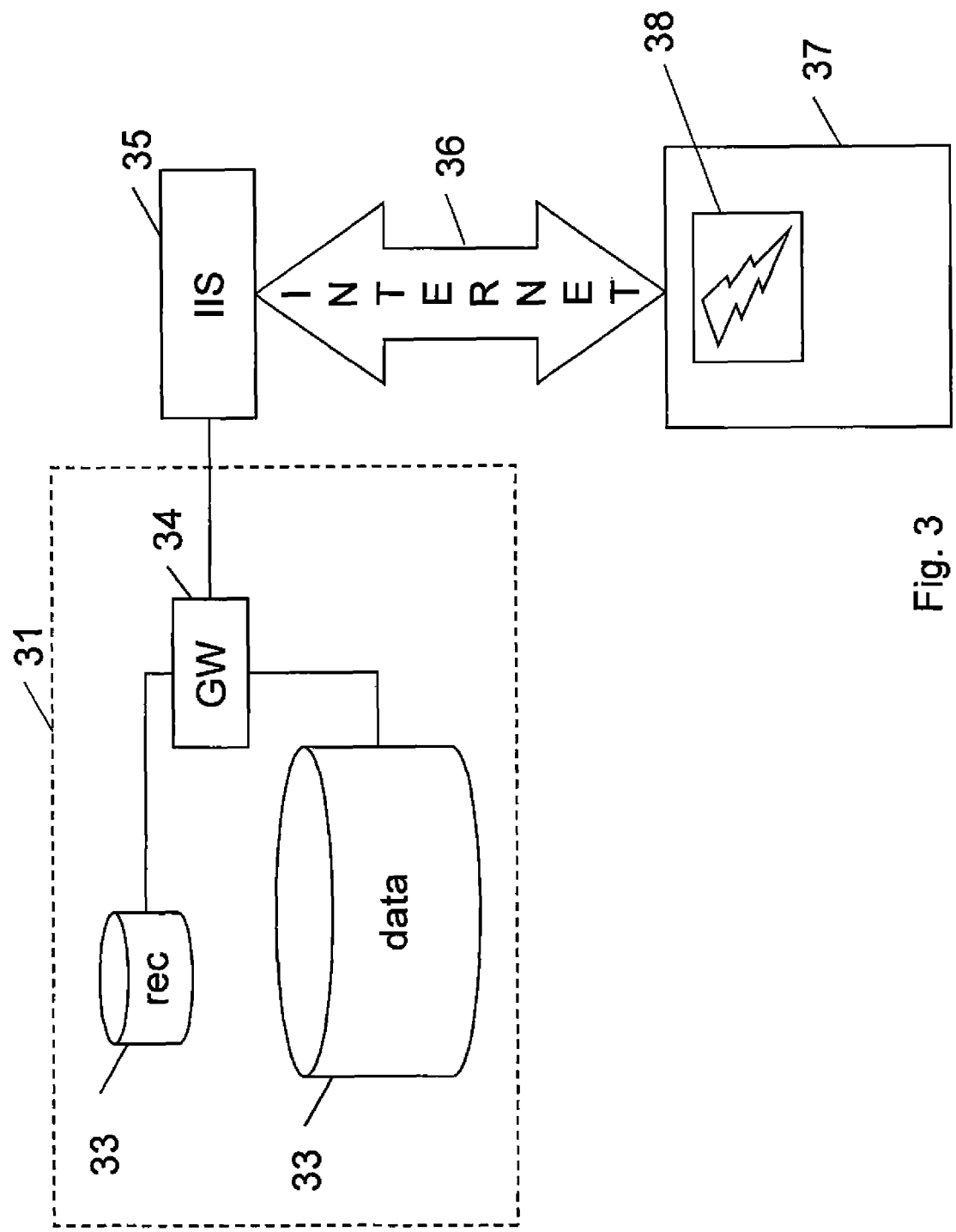
FIG. 3 is a diagram of a known networked computer system running the Smooth Streaming media service.
Figure 4:
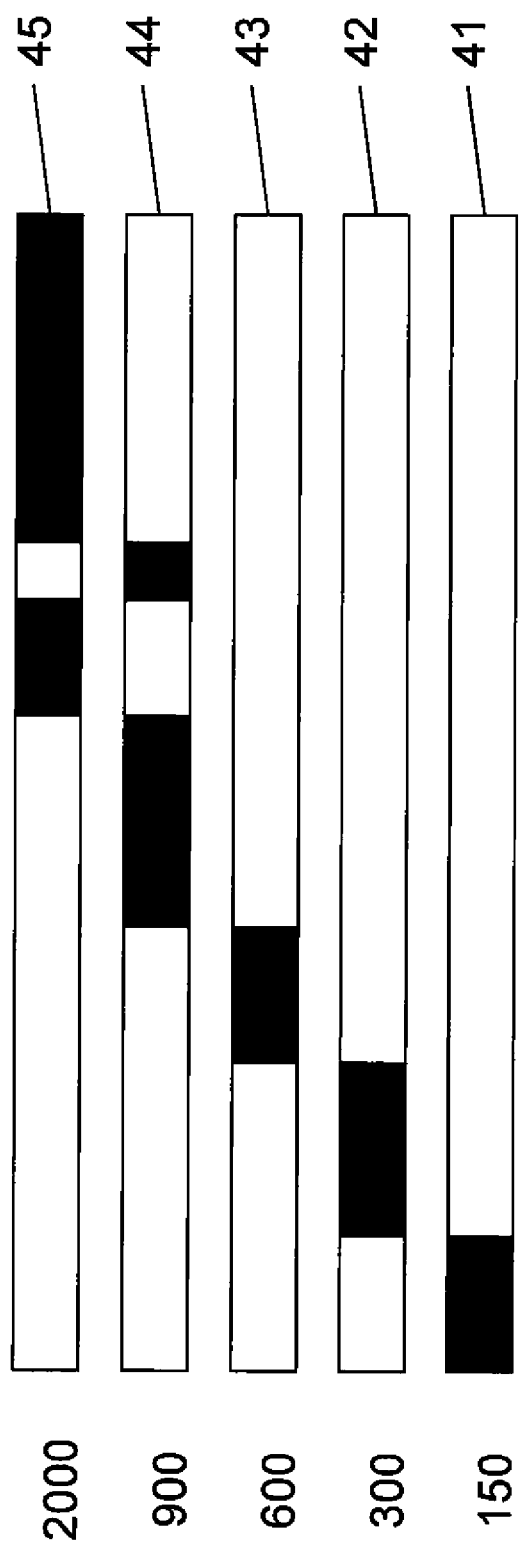
FIG. 4 shows the use of files by the system of FIG. 3.
Figure 5:
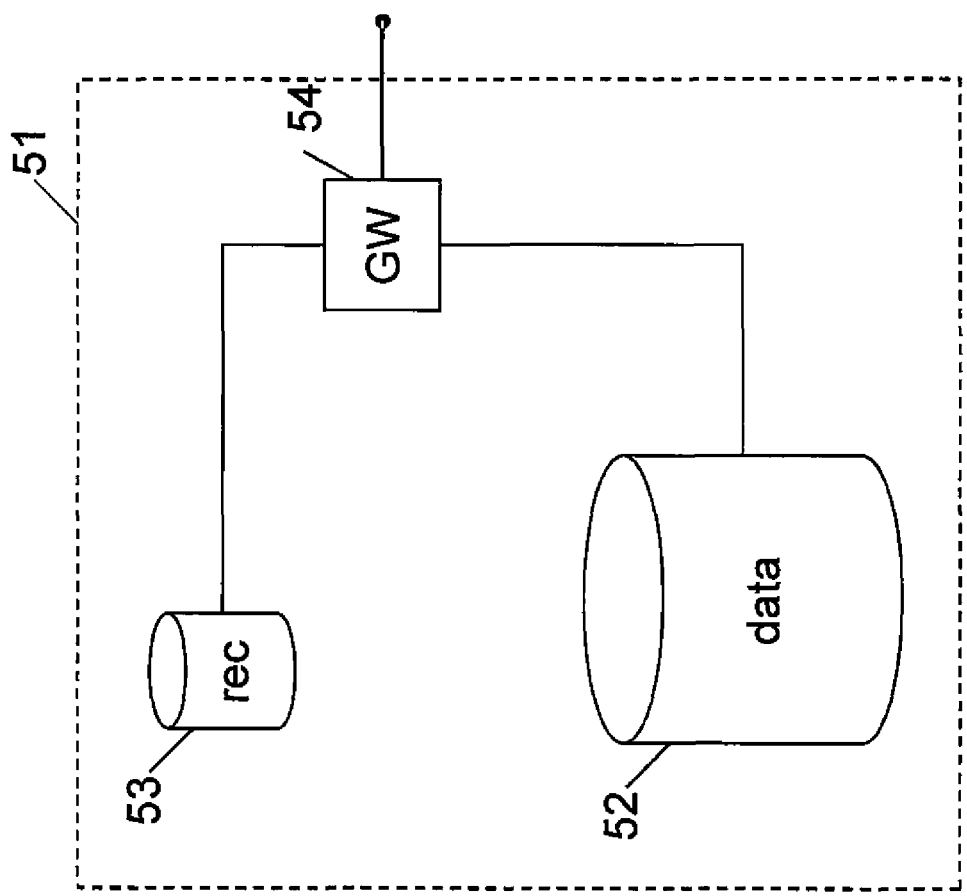
FIG. 5 is a diagram of a file system in accordance with a first embodiment of the present invention.

A file system in accordance with a first embodiment of the invention is shown in FIG. 5. The file system 51 comprises a data store 52, a file record database 53, and a file system gateway 54. The file system 51 is in the present embodiment used as part of an IIS server system as described above with reference to FIG. 3, to provide file data for the fragmented MPEG-4 format files of differing quality required by the Smooth Streaming media service. However, the skilled person will appreciate that the file system 51 could equally be used with other systems that request portions of media files, and is not restricted to use only for providing files for an IIS server, and/or for providing files to be used with the Smooth Streaming media service.

The data store 52 of the file system 51 contains original file data for video that can be streamed by the IIS server.

This is the file data from which the files of differing quality required by the IIS server are derived. However, the file system 51 does not contain the pre-generated files of differing quality themselves, but instead generates and returns the file data making up those files only on request, as follows.

Figure 6:
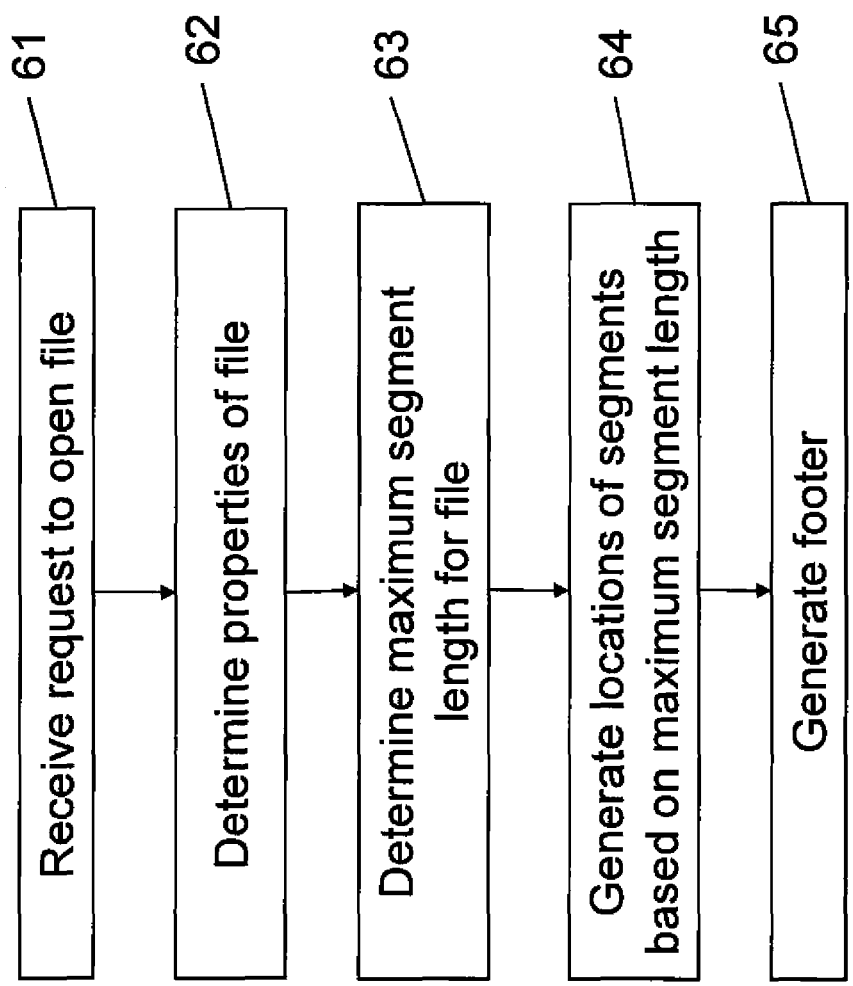
FIG. 6 is a flow chart showing the operation of the system of the first embodiment in response to a request to open a file.

The operation of the file system 51 in response to a request to open a file is shown in FIG. 6. First, a request to open a file of a particular quality is received (step 61). The file system 51 then determines the required properties for the file (step 62), for example the quality of the file and the time duration of the moofs making up the file. The file system 51 then determines a maximum segment length (step 62). This is based upon the maximum possible size of a moof, which is calculated by assuming the minimum possible compression of the images making up the GOPs in the moof.

In one particularly advantageous embodiment, the determination of the maximum possible size of a moof is done by assuming that no inter-frame compression is done in the GOPs making up the moof. In practice, this means assuming that each image in a GOP is an I-frame, which is an image the encoding of which does not depend on the encoding of any other images in the GOP. I-frames contrast with P-frames, B-frames and D-frames, which are images encoded using information on how they differ from other images in the GOP. P-frames, B-frames and D-frames are used to provide a higher level of compression, and are particularly effective in cases where images in a GOP identical or very similar.

Once the maximum possible size of a moof has been calculated, the maximum segment length is then determined to be at least that maximum possible size. However, the maximum segment length need not be taken to be exactly the same as the maximum moof size. For example, the same maximum segment length may be used for each quality of file provided by the file system 51. In this case, the maximum segment length will be determined using the maximum moof size for the highest quality of file, so will be much greater than is required for the lower quality files.

A location for each moof within the file is then calculated, by assuming that each moof has the maximum segment length (step 64). The index file will take up an initial range of bytes, with the first moof being located immediately after the end of the index file. Each subsequent moof is then located after the end of the preceding moof, which is assumed to have the maximum segment length. The calculated locations are then used to generate a footer for the file (step 65), which can be returned to the IIS server.

Figure 7:
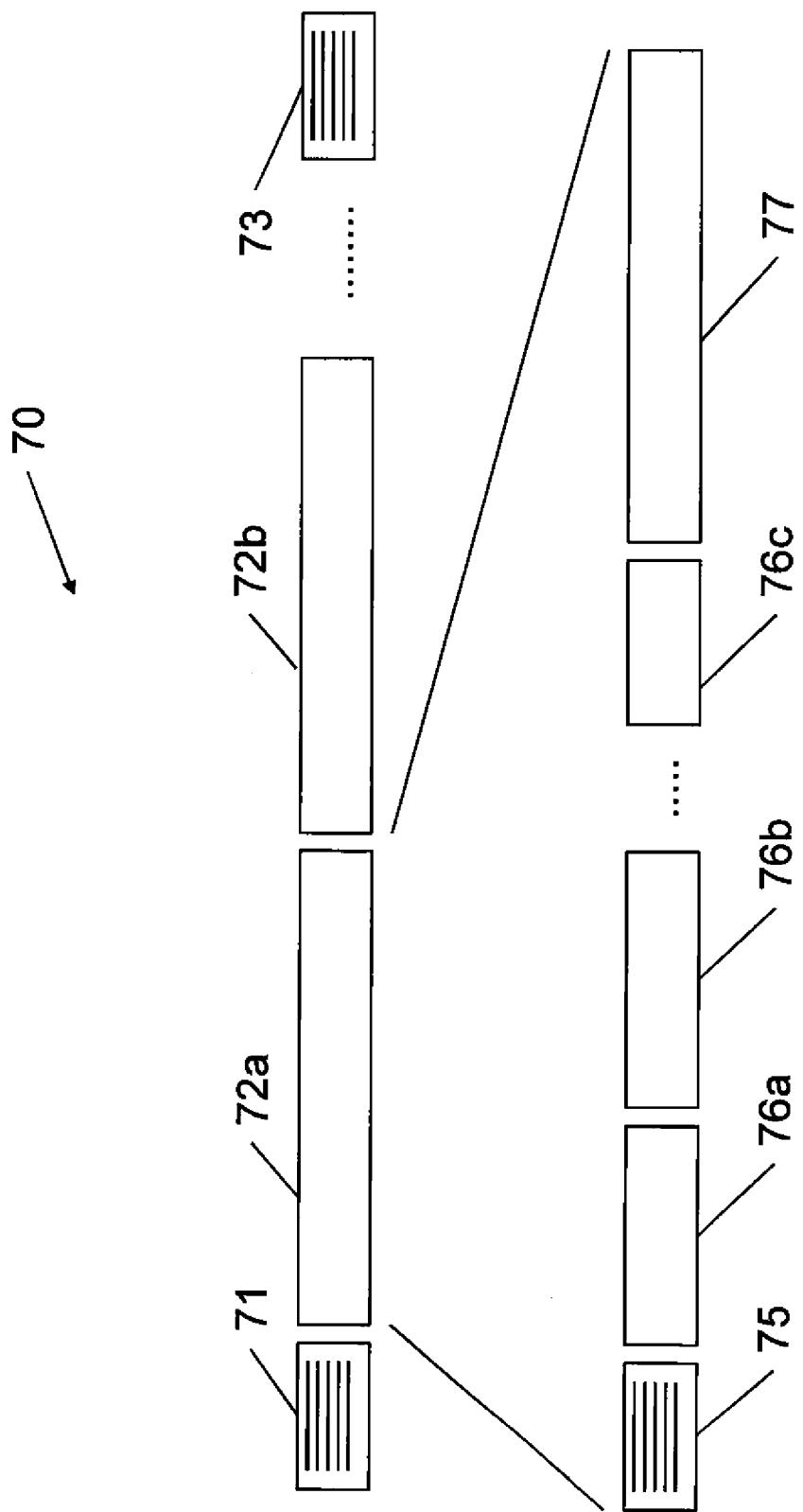
FIG. 7 shows the structure of a fragmented MPEG-4 file in accordance with the first embodiment.

FIG. 7 shows the structure of the file described by the calculated locations (though the file itself has not in fact been generated). The file 70 begins with the index 71. There then follow moofs 72a, 72b etc. As can be seen from FIG. 7, each moof is of the same length, namely the maximum segment length. The file 70 then ends with the footer 73.

Figure 8:
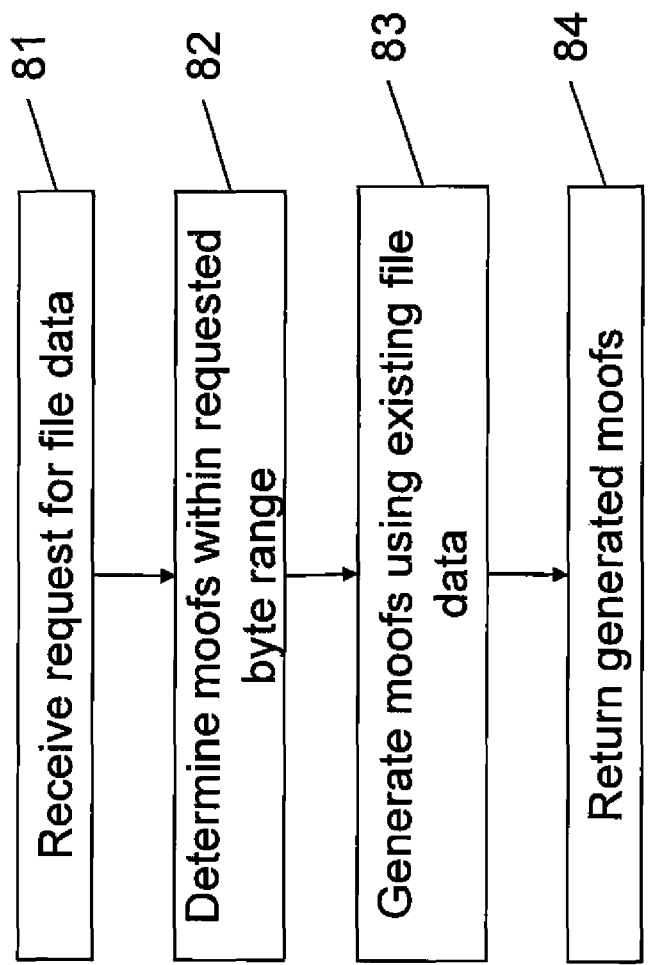
FIG. 8 is a flow chart showing the operation of the system of the first embodiment in response to a request for file data.

The operation of the file system 51 in response to a request for file data is now described with reference to FIG. 8. First, a request for file data from the file is received (step 81). This will be a request for file data in a certain byte range. Using the calculated locations for the moofs, the file system 51 determines which moofs are being requested (step 82).

The file system 51 then generates moofs with the required properties from the original file data already stored in the file system 51 (step 83). So, for example, a request may be made by the IIS server for file data for a particular byte range in a file of quality 2000 Kb/s. The IIS server will have taken this byte range from calculated locations in the footer provided by the file system 51. Thus, the file system 51 is able to determine from the requested byte range the moofs being requested by the IIS server, and in turn from the moofs the time range of video being requested (because the time range of each individual moof is known). The file system 51 is then able to generate the moofs at the required quality using the original file data.

It will be appreciated, however, that the moofs generated from the original file data are unlikely to be of the maximum segment length, i.e. the length expected by the IIS server. To solve this, the end of a moof is padded with blank data; the fragmented MPEG-4 format in fact explicitly defines a padding instruction that can be used for this purpose. The structure of the padded moof is also shown in FIG. 7. The padded moof comprises an index 75 and GOPs 76a, 76b to 76c generated using the original file data. The GOPs are followed by padding 77, with the length of the padding 77 being such that the length of the moof matches the maximum segment length.

Finally, the padded moofs are returned to the IIS server (step 84).

Thus, it can be seen that the file system 51 of the present embodiment is able to provide file data for the files of different qualities to an IIS server only when a particular portion of file data is requested, despite the file system 51 being obliged to declare in advance (via the footers for the files) the locations of all of the moofs within the files.

Further, while the file data a padded moof is comprised of is generated and sent to the IIS server as required, the padded moof itself does not need to be explicitly stored in the file system 51 at any stage. Consequently, the apparent additional space taken up by the padding does not require a corresponding space in the data store 52 of the file system 51. Rather, as file data corresponding to padding data is requested from the file system 51, the gateway 53 can simply dynamically generate and send that padding data to the IIS server.

In addition, the Smooth Streaming media service is defined such that an IIS server on receipt of a moof transfers only the GOPs contained within the moof to a client application, and does not transfer any padding data. As a consequence, the increase in the size of the moofs to the maximum segment size does not result in an increase in the amount of file data that must be transferred from an IIS server to a client application in order to transfer a particular time segment of video.

A file system in accordance with a second embodiment of the present invention is now described. The structure of the file system is the same as that shown in FIG. 5. (In fact, both first and second embodiments of the invention could be embodied by the same file system.) The file system is arranged to provide files in MPEG-4 format to a video editing application. As in the first embodiment, the data store of the file system contains original file data for video, in this case in a file format other than MPEG-4.

Similarly to the first embodiment, in response to a requested from the video editing application for a file (which in this case will be an MPEG-4 format file), the file system determines the required properties for the file. The file system then determines the maximum segment length for the file. However, in the present embodiment the maximum segment length is based upon the maximum possible size of a GOP (as opposed to a moof that comprises multiple GOPs). Similarly to before, this is calculated by assuming the minimum possible compression of the images making up a GOP. The maximum segment length is then determined to be at least that maximum possible size. A location for each GOP within the file is then calculated by assuming that each GOP has the maximum segment length, and this is used to generate the index, which can be returned to the video editing software.

Figure 9:
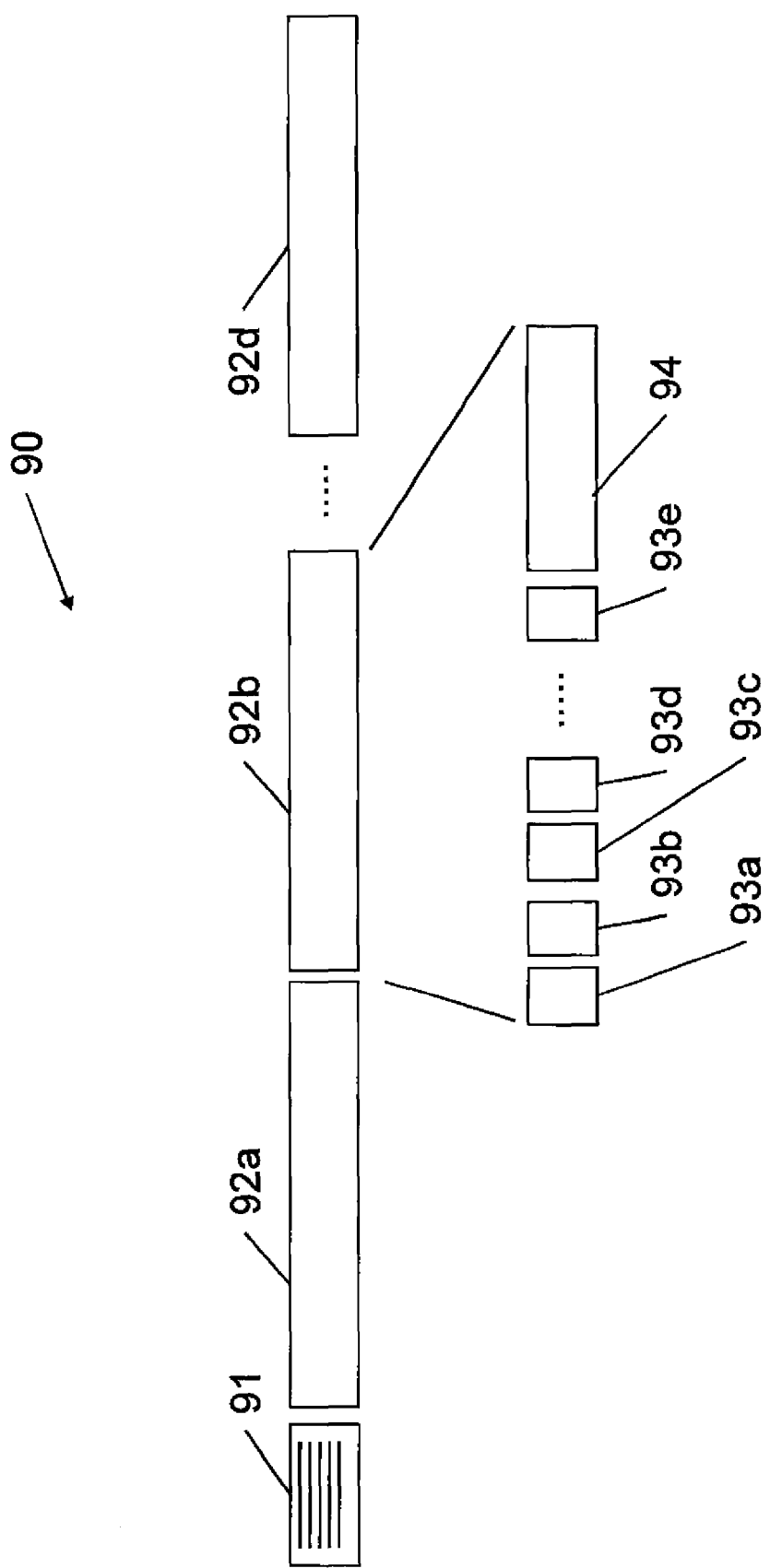
FIG. 9 shows the structure of an MPEG-4 file in accordance with a second embodiment.

FIG. 9 shows the structure of the MPEG-4 file described by the calculated locations. The file 90 begins with the index 91. There then follow GOPs 92a, 92b to 92d. As can be seen from FIG. 9, each GOP is of the same length, namely the maximum segment length.

Similarly again to the first embodiment, in response to a request for file data from the file, the file system uses the calculated locations to determine which GOP is being requested, generates a GOP with the required properties from the original file data, and returns the file data making up that GOP. Further, if (as will usually be the case) the length of the GOP is not the same as the maximum segment length, the end of the GOP is padded with blank data, in this case simply a string of zeros. The structure of the padded GOP is also shown in FIG. 9; the GOP comprises frames 93a, 93b, 93c, 93d to 93e, followed by padding 94. The padded GOP can then be returned to the video editing software.

Whilst the present invention has been described and illustrated with reference to particular embodiments, it will be appreciated by those of ordinary skill in the art that the invention lends itself to many different variations not specifically illustrated herein.

The invention claimed is:

1. A method comprising:
    receiving a request to open a file wherein the format of the file requires that the file comprise a plurality of segments of file data located at pre-declared locations within the file, and wherein the file data making up the file is based upon derived file data;
    determining a maximum segment length for the file based on a quality of media provided by the file;
    requesting a location of a segment within the file;
    calculating the location by considering each segment of the file to have the maximum segment length;
    returning the location;
    receiving a request for file data from a segment of the file; and
    returning generated file data for the segment, wherein the generated file data comprises the derived file data and padding data to give the generated file data the maximum segment length.

2. A method as claimed in claim 1, wherein each segment of file data in the file corresponds to a section of media of a pre-determined time period.

3. A method as claimed in claim 2, wherein the maximum segment length is at least the maximum possible length of file data corresponding to a section of media of the pre-determined time duration.

4. A method as claimed in claim 1, wherein the maximum segment length is calculated by assuming a minimum possible compression of the file data making up a segment.

5. A method as claimed in claim 1, wherein the generated file data comprises the derived file data followed by the padding data.

6. A method as claimed in claim 1, wherein the derived file data is derived from existing file data.

7. A method as claimed in claim 6, wherein the file data is derived from the existing file data by converting the existing file data to a different quality.

8. A method as claimed in claim 7, wherein the quality of the derived file data is determined using the maximum segment length.

9. A method as claimed in claim 1, further comprising the step of generating an index for the locations of each of the segments in the file.

10. A method as claimed in claim 9, wherein the file comprises the index.

11. A method as claimed in claim 1, wherein padding data is dynamically generated and sent by the file system as the file data from the file that corresponds to padding data is requested.

12. A file system comprising at least one processor and at least one memory configured for:
    receiving a request to open a file wherein the format of the file requires that the file comprise a plurality of segments of file data located at pre-declared locations within the file, and wherein the file data making up the file is based upon derived file data;
    determining a maximum segment length for the file based on a quality of media provided by the file;
    requesting a location of a segment within the file;
    calculating the location by considering each segment of the file to have the maximum segment length;
    returning the location;
    receiving a request for file data from a segment of the file; and
    returning generated file data for the segment, wherein the generated file data comprises the derived file data and padding data to give the generated file data the maximum segment length.

13. A file system as claimed in claim 12, wherein each segment of file data in the file corresponds to a section of media of a pre-determined time duration.

14. A file system as claimed in claim 13, wherein the maximum segment length is at least the maximum possible length of file data corresponding to a section of media of the pre-determined time duration.

15. A file system as claimed in claim 12, wherein the maximum segment length is calculated by assuming a minimum possible compression of the file data making up a segment.

16. A file system as claimed in claim 12, wherein the generated file data comprises the derived file data derived followed by the padding data.

17. A file system as claimed in claim 12, wherein the derived file data is derived from existing file data.

18. A file system as claimed in claim 17, wherein the file data is derived from the existing file data by converting the existing file data to a different quality.

19. A file system as claimed in claim 18, wherein the quality of the derived file data is determined using the maximum segment length.

20. A file system as claimed in claim 12, further arranged to generate an index for the locations of each of the segments in the file.

21. A file system as claimed in claim 20, wherein the file comprises the index.

22. A file system as claimed in claim 12, wherein padding data is dynamically generated and sent by the file system as the file data from the file that corresponds to padding data is requested.

23. A non-transitory computer-readable storage medium having stored thereon a program comprising a set of instructions for causing a processor to perform the steps of:
    receiving a request to open a file wherein the format of the file requires that the file comprise a plurality of segments of file data located at pre-declared locations within the file, and wherein the file data making up the file is based upon derived file data;

determining a maximum segment length for the file based on a quality of media provided by the file;
requesting a location of a segment within the file;
calculating the location by considering each segment of the file to have the maximum segment length;
returning the location;
receiving a request for file data from a segment of the file; and
returning generated file data for the segment, wherein the generated file data comprises the derived file data and padding data to give the generated file data the maximum segment length.

* * * * *